US012600283B1

(12) United States Patent
Quintero

(10) Patent No.: US 12,600,283 B1
(45) Date of Patent: Apr. 14, 2026

(54) SELF-CLEANING FLOOR MAT

(71) Applicant: Leonardo Luis Quintero, Newark, NJ (US)

(72) Inventor: Leonardo Luis Quintero, Newark, NJ (US)

( * ) Notice: Subject to any disclaimer, the term of this patent is extended or adjusted under 35 U.S.C. 154(b) by 0 days.

(21) Appl. No.: 18/669,456

(22) Filed: May 20, 2024

(51) Int. Cl.
*B60N 3/04* (2006.01)
*A47L 5/14* (2006.01)

(52) U.S. Cl.
CPC ................ *B60N 3/048* (2013.01); *A47L 5/14* (2013.01)

(58) Field of Classification Search
CPC .................................. B60N 3/048; A47L 5/14
See application file for complete search history.

(56) References Cited

U.S. PATENT DOCUMENTS

| | | | | |
|---|---|---|---|---|
| 4,828,898 | A | * | 5/1989 | Bailey .................... B60N 3/048 |
| | | | | 428/95 |
| 8,298,644 | B2 | * | 10/2012 | Booth .................... B60N 3/048 |
| | | | | 428/95 |
| 9,986,889 | B2 | * | 6/2018 | Looney ................... A47L 9/242 |
| 2002/0178528 | A1 | * | 12/2002 | Koch ..................... A47L 23/263 |
| | | | | 15/310 |
| 2024/0239256 | A1 | * | 7/2024 | Abro ...................... B60N 3/048 |

FOREIGN PATENT DOCUMENTS

| | | | | | |
|---|---|---|---|---|---|
| IN | 202311031301 | A | * | 6/2023 | |
| JP | 2003210308 | A | * | 7/2003 | ............. B60N 3/046 |
| JP | 7129009 | B2 | * | 9/2022 | |
| KR | M309944 | U | * | 4/2007 | |
| KR | 20120096739 | A | * | 8/2012 | |
| KR | 101470491 | B1 | * | 12/2014 | |
| KR | 20150109620 | A | * | 10/2015 | |
| KR | 20170024859 | A | * | 3/2017 | |
| KR | 101759623 | B1 | * | 7/2017 | |
| KR | 20200021646 | A | * | 3/2020 | |
| KR | 20200069748 | A | * | 6/2020 | |
| KR | 20220166667 | A | * | 12/2022 | |
| KR | 20230083839 | A | * | 6/2023 | |

OTHER PUBLICATIONS

KR-20200021646-A English Machine Translation (Year: 2020).*
KR-20200069748-A English Machine Translation (Year: 2020).*
KR-20220166667-A English Machine Translation (Year: 2022).*
KR 20150109620 A—English Machine Translation (Year: 2015).*

* cited by examiner

*Primary Examiner* — Marc Carlson
(74) *Attorney, Agent, or Firm* — Joshua Kaplan; Kaplan Law Practice LLC

(57) ABSTRACT

A vehicular floor mat comprises a main body and a vacuum assembly. The main body comprises a solid base member and a mesh cover. A plurality of ridges project upwardly from a substantially planar top surface of the base member forming complimentary grooves configured to collect water or waste. The vacuum assembly comprises a first compartment configured to receive the water or waste through one or more inlet ports disposed at the front of the vacuum assembly, a second compartment housing a blower wheel that is activated by a motor, a vertical filter disposed between the first and second compartments, and one or more outlet exhaust ports. When the motor is activated, the blower wheel creates a suction force to draw the water or waste from the grooves and into the first compartment.

20 Claims, 6 Drawing Sheets

68

56

78

58

54

66

28, 52

54

SELF-CLEANING FLOOR MAT

FIELD OF THE INVENTION

The embodiments of the present invention relate to vehicular floor mats and more particularly pertains to a new apparatus for collecting and removing slosh carried by, and deposited from, the footwear of a driver or passenger entering a vehicle.

BACKGROUND OF THE INVENTION

Vehicular floor mat protectors shield the floor mats in vehicles from dirt, debris, water, and other potential sources of damage. These protectors are typically removable and easy to clean. However, since drivers and passengers (collectively hereinafter, "riders" or "occupants") must keep their feet (i.e., footwear) on the protectors during a trip, it is likely that riders will continue to have their footwear in contact with the same slosh throughout the trip, which may lead to rider discomfort. Additionally, when removing the protectors, drivers may need to exercise care to avoid spilling the slosh on them.

Additionally, the floor of a vehicle naturally serve as catch pans for debris and spillages. Riders often utilize their time riding inside vehicles engaged in eating and drinking. Since in most cases there are no folding tables to catch food debris, there is nothing to interpose between a rider's hand and the floor of a vehicle. This combined with constant jerking and bumping of a typical ride, and you end up with a floor mat that quickly accumulates debris and moisture, both food and non-food.

To combat the natural buildup of filth and debris, auto owners are forced to spend a lot of time and money to periodically clean the floor pans and floor mats, using a variety of small and commercial vacuums or cleaning services. This not only costs time and money, but sidelines the vehicle for the duration of the cleaning.

The foregoing problems demonstrate the need for an apparatus for collecting and separating slosh from the riders' footwear during the course of a trip, as well as for disposing of the slosh after the trip in a safe and hygienic manner.

SUMMARY OF THE INVENTION

The vehicular floor mat according to the embodiments described herein addresses the above-described problems associated with conventional vehicular floor mats and floor mat protectors. In particular, the present invention is configured to collect water or waste and store it in a waste compartment for easy disposal at a later time. Additionally, by removing and storing the water or waste out of the way, the vehicle's occupants need not keep their footwear in contact with a wet floor mat. Embodiments of the present invention disclose a floor mat comprising a main body and a vacuum assembly.

In one embodiment, the floor mat includes a main body having a solid base member and a mesh cover. Each one of the base member and the mesh cover have respective and aligned front, rear, right and left sides, and substantially planar top and bottom surfaces. A plurality of ridges are integrated into, and extend vertically from, the substantially planar top surface of the base member. The ridges form grooves therebetween, across the top planar surface of the base member. The grooves are configured to collect and channel the water or waste to either of the front or rear sides of the base member. The vacuum assembly has a front, rear, and right and left sides. The vacuum assembly includes one or more inlet ports disposed at the front of the vacuum assembly, one or more outlet exhaust ports disposed at the rear of the vacuum assembly, and a vertical filter separating the vacuum assembly into first (or forward) and second (or rear) compartments. The first compartment is a waste storage compartment configured to receive the water or waste through the one or more inlet ports, either at the front side or rear side of the base member. The second compartment houses a vacuum apparatus. The vacuum apparatus includes a blower wheel, a motor, and a drive shaft having one end operatively associated with the motor and another end operatively associated with the blower wheel. When the motor is activated, the motor causes the drive shaft to engage the blower wheel. The vacuum apparatus creates a suction force to draw the water or waste from the grooves, through the one or more inlet ports and into the first compartment.

In one embodiment, the mesh cover is configured to rest upon and be supported by upper surfaces of the plurality of ridges. The mesh cover may be detachably coupled to the base member.

In one embodiment, the second compartment further houses a power source operatively associated with the motor.

In one embodiment, the second compartment further houses a communications module configured to receive a signal from a remote device, and a controller operatively associated with the motor and configured to receive the signal from the communications module. The controller is programmed to activate or deactivate the motor based on the received signal.

In one embodiment, the ridges are configured so as to form at least substantially parallel and perpendicular longitudinal and lateral grooves across the top surface of the base member.

In one embodiment, the ridges are at least substantially rectangular. In another embodiment, the ridges are at least partially curved.

In one embodiment, the main body further includes a peripheral border rim adjoining the base member.

In one embodiment, the vacuum assembly is detachably coupled to the base member. The vacuum assembly may be detachably coupled to the front of the base member or to the rear of the base member.

In one embodiment, the one or more exhaust ports are configured having any one of a horizontal orientation, a vertical orientation, or an angled orientation such that the one or more exhaust ports are positioned at an intermediate angle between horizontal and vertical orientations, or a combination thereof.

In one embodiment, the first compartment has an inner cavity for storing the water or waste. The first compartment may have a removable cover. The first compartment may also be detachably coupled to the front or rear side of the base. The inner cavity is accessible when either the cover is removed or when the first compartment is decoupled from the base member.

BRIEF DESCRIPTION OF DRAWINGS

The accompanying figures illustrate several embodiments of the invention and, together with the description, serve to explain the principles of the invention. One of ordinary skill in the art readily recognizes that the particular embodiments illustrated in the figures are merely exemplary and are not intended to limit the scope of the present invention.

DETAILED DESCRIPTION OF THE INVENTION

Figure 1:
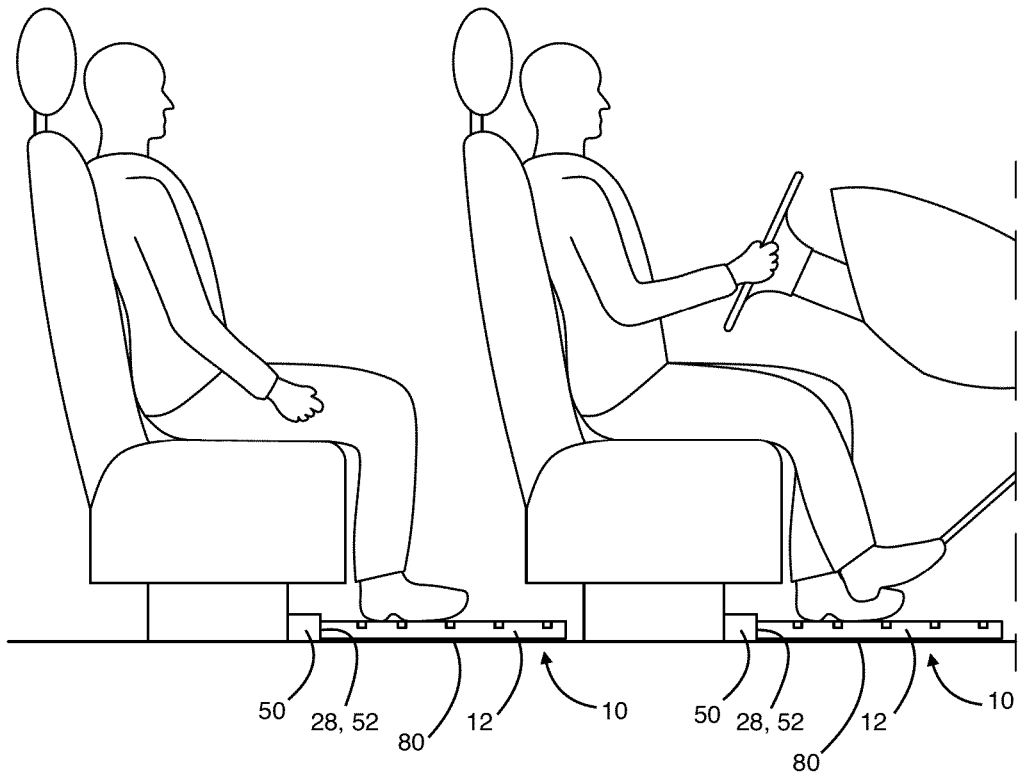
FIG. 1 is a side view of front and rear seat vehicular floor mats according to one embodiment of the present invention.

The preferred embodiments of the present invention will now be described with reference to the drawings. Identical elements in the various figures are identified with the same reference numerals. The presentation of reference numerals within parentheses indicates that the mentioned reference numeral appears in a figure other than the figure(s) under discussion or is disclosed in an embodiment not presented in the figures.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Turning now descriptively to the drawings, in which similar reference characters denote similar elements throughout the several views, the figures illustrate a vehicular floor mat 10 according to one or more embodiments. Floor mat 10 includes a main body 12 and a vacuum assembly 50. Main body 12 has a solid base member 20 and a mesh cover 42 in the form of a horizontal filter (see FIGS. 2, 3 and 7-9). A vertically arranged filter 60 (or "vertical filter") divides vacuum assembly 50 into a first or waste compartment 66 and a second or fan or vacuum compartment 68.

In one embodiment, as shown in the figures (e.g., FIGS. 2-4), base member 20 has a top side 22, a bottom side 24, a front 26, a rear 28, and right and left sides 30 and 32, respectively. Mesh cover 42 has a top side 44 and a bottom side 46. (Front 26 may also refer to the front of main body 12 and, by extension, the front of mesh cover 42, as the fronts of main body 12 and mesh cover 42 are aligned. Similarly, rear 28 may also refer to the rear of main body 12 and, by extension, the rear of mesh cover 42, as the rears of main body 12 and mesh cover 42 are aligned.) The bottom side 46 of mesh cover 42 is in communication with an upper surface 38 of base member 20 when the two are mated, as described below in further detail. As shown in FIG. 1, passengers rest their feet on top side 44 when riding in the vehicle.

Figure 7:
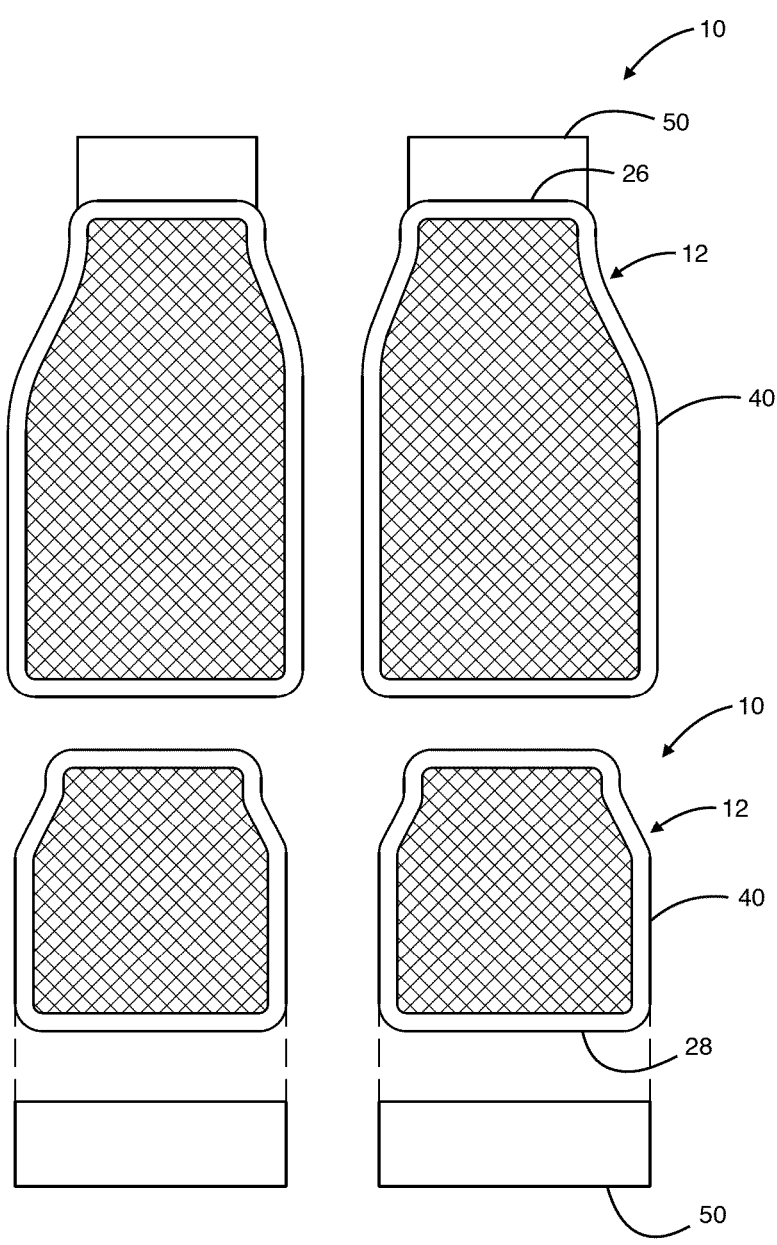
FIG. 7 is a top view of front seat floor mats and a partial exploded view of rear seat floor mats according to one embodiment of the present invention.

In one embodiment, a peripheral border or rim 40 is arranged around base member 20, such as shown in FIG. 7.

(In FIG. 7, numeral main body 12 is used; however, it should be understood that numeral 12 in that instance alternatively refers to base member 20 for the purpose of discussing rim 40.) Rim 40 projects upwardly so as to confine liquids within base member 20. As such, base member 20 acts as a temporary containment tray for liquids and other debris that will be expelled or removed from floor mat 10, as described below in further detail. In another embodiment, rim (40) is arranged around only two or three sides of base member (20), leaving base member (20) open at least along the side at which it is coupled to vacuum assembly (50).

Figure 2:
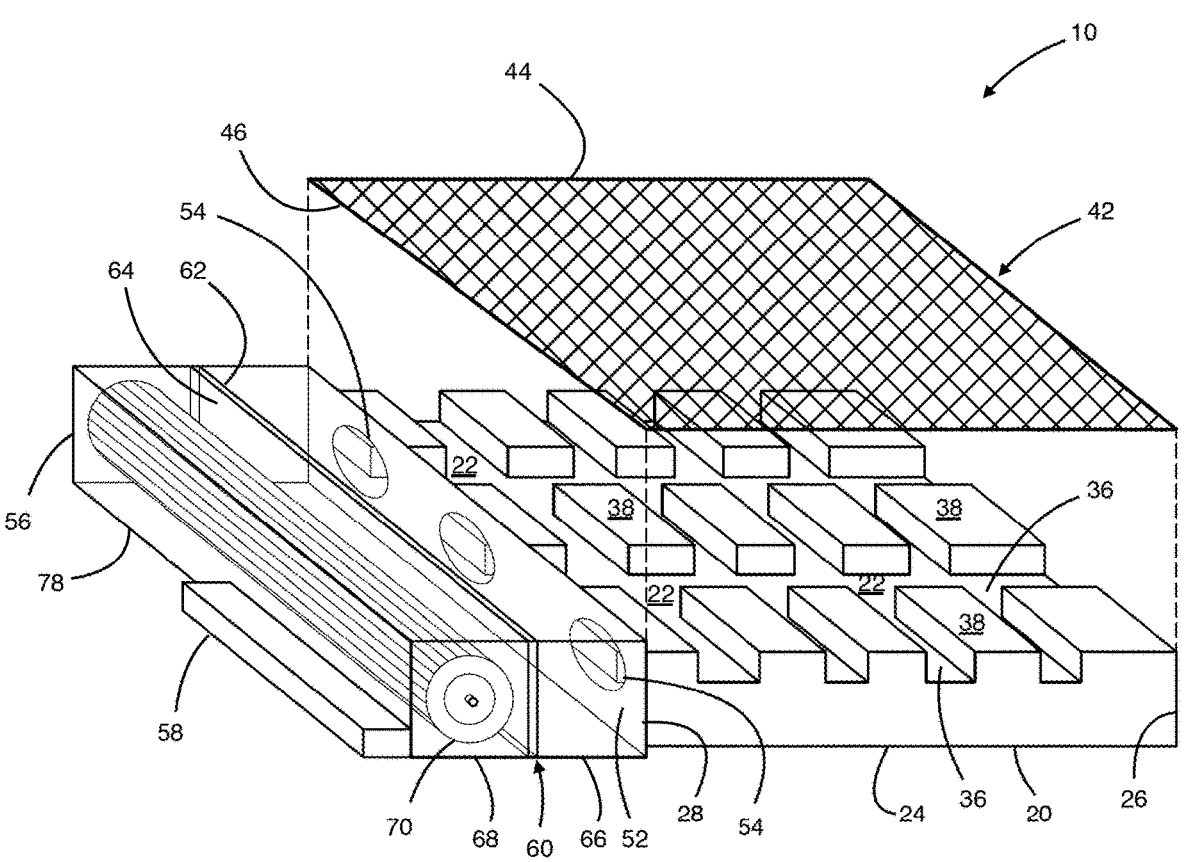
FIG. 2 is a side perspective, partially exploded view of a vehicular floor mat according to one embodiment of the present invention.
Figure 4:
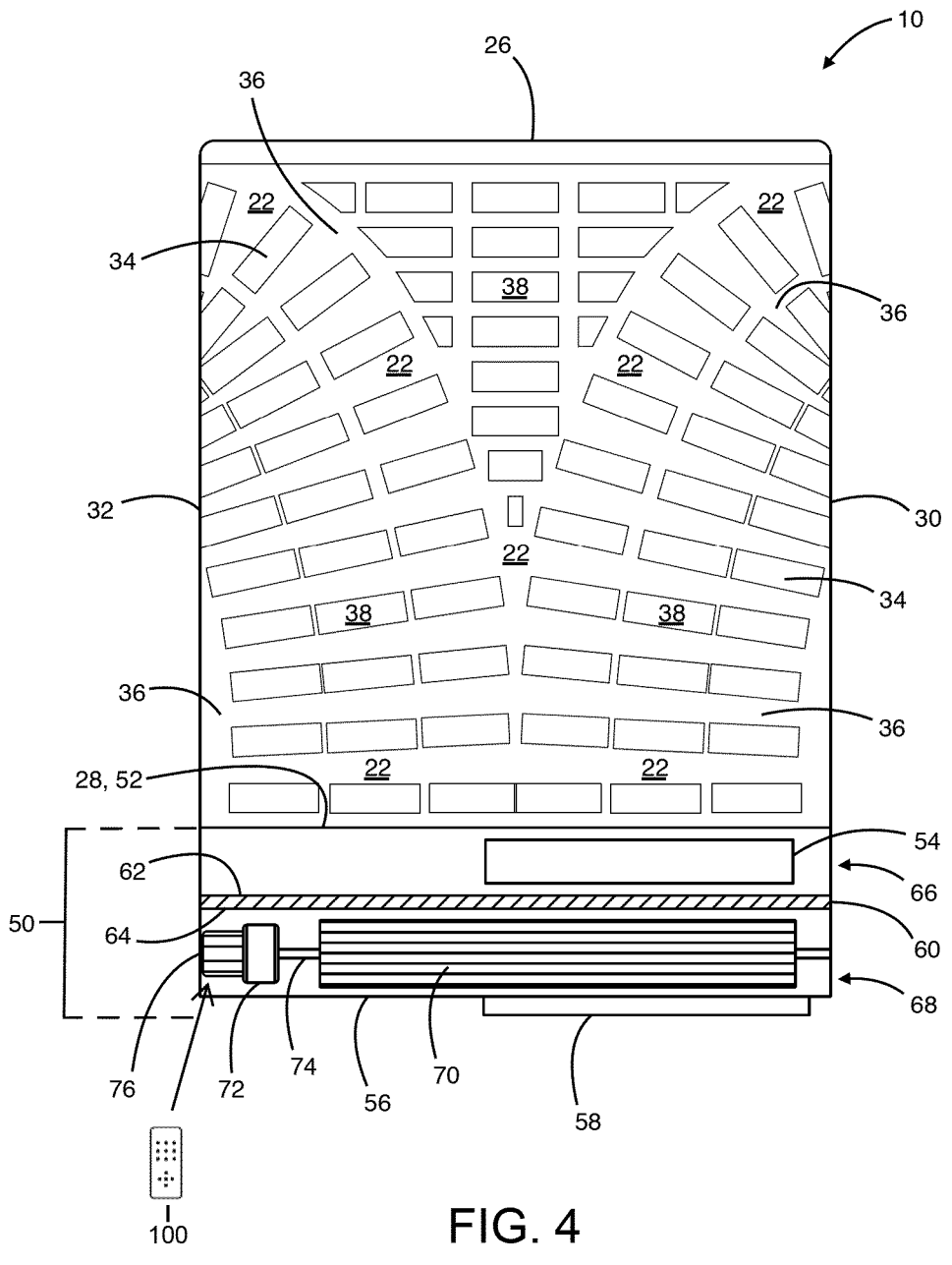
FIG. 4 is a top view of a vehicular floor mat according to one embodiment of the present invention.

In one or more embodiments, base member 20 further includes a plurality of raised bosses or ridges 34 that project upwards from top side 22. The top surfaces of the plurality of ridges 34 constitute the upper surface 38 of base member 20. (Top side 22 is a lower (upper) surface of base member 20 while upper surface 38 is a higher (upper) surface of base member 20.) Ridges 34 are shown in FIG. 2 as having a rectangular-shape. Ridges 34 are shown in FIG. 4 as having a rectangular shape or an asymmetric trapezoid shape. Ridges 34 may be uniform in shape and size/dimension (as shown in FIG. 2) or may have two or more different varieties of size/dimension (as shown in FIG. 4). Ridges 34 are separated by a series of at least substantially parallel and substantially perpendicular intersecting longitudinal and lateral channels or grooves 36 on the top side 22 of base member 20. Channels 36 provide drainage of base member 20 towards one or more inlet apertures or ports 54, as will be described below in further detail.

In one or more embodiments (not shown), ridges (34) are configured with any desired shape, such as, but not limited to, squares, circles, triangles, pentagons, hexagons, heptagons, octagons, nonagons, decagons, rhombuses, trapezoids, parallelograms, ellipses, ovals, crosses, the aforementioned rectangles, or a combination thereof. In such embodiments, channels (36) are characterized as having or forming complimentary or interdependent shaped paths.

In one embodiment, as shown in FIG. 4, the top side 24 of base member 20 and the upper surface 38 of ridges 34 are characterized as having a developing curvature in the direction from the rear 28 to the front 26, along the same horizontal plane—also referred to as a palmate layout or arrangement—to better facilitate drainage of liquids or other waste matter towards inlet apertures 54 at rear 28. In particular, FIG. 4 shows a single back row (proximate to rear 28) parallel to rear 28, with successive right and left rows splitting up into the palmate layout with increasing angled or sloped laterally angled rows of ridges in the direction of front 26 of base member 20. The resultant channels 36, some of which having a curvature or angled slope, may thus be optimized for delivering the flow of water or waste material to first compartment 66, as will be described below in further detail.

In another embodiment, some or all of the ridges (34) have a curved shape along substantially the entirety of their length. As described above, the complimentary formed channels (36) orient towards the one or more inlet apertures (54).

In an embodiment in which vacuum assembly is coupled to the front 26 of base member 20 (e.g., front driver and front passenger floor mats 10 in FIG. 7), a palmate arrangement may be provided, wherein the developing curvature is in the direction from the front 26 to the rear 28.

In one embodiment (not shown), ridges (34) have a tapered configuration, featuring a wider base (at or proximate to top side 22) and gradually narrowing towards their upper tip (at or proximate to upper surface 38). This may include a symmetrical taper—i.e., two (or more) sides are tapered—or an asymmetric taper, with one (or fewer than all) side(s) sloping gradually from the base to the upper tip, while the opposite side(s) remains straight and vertically aligned. Additionally, some ridges (34) may have a symmetrical taper while the remaining ridges (34) have an asymmetrical taper.

In one embodiment, ridges 34 are integrally formed with base member 20.

In another embodiment, ridges (34) are detachably coupled to top side (22) of base member (20) so as to be easily removed, replaced or rearranged. In this embodiment, ridges (34) are coupled to top side (22) with adhesives, fasteners, or other known mechanisms. Such fasteners may include, but are not limited to, snap buttons, magnetic fasteners, hook-and-loop fasteners, quick-release buckles, snap hooks/carabiners, zippers, or a combination thereof.

In one embodiment, as shown in the figures (e.g., FIG. 2), ridges 34 are arranged along the width of base 20 member (i.e., from right side 30 to left side 32). In FIG. 4, ridges 34 are arranged substantially generally along the width of base 20 proximate to rear 28.

In one or more embodiments (not shown), longitudinal ridges (34) are arranged along the length of base member (20), with complimentary channels (36) running lengthwise of base member (20) as well. The longitudinal ridges (34) may be situated along at least substantially the entirety of the length of base 20 member from front 26 to rear 28. Longitudinal ridges (34) may be unbroken, in which case only continuous longitudinal channels (36) are provided. Alternatively, lateral channels (36) may be provided that intersect the longitudinal ridges (34), resulting in a series of broken longitudinal ridges (34). In one embodiment, the palmate layout (described above) may be configured with the continuous or broken longitudinal ridges (34), or a combination thereof.

Figure 3:
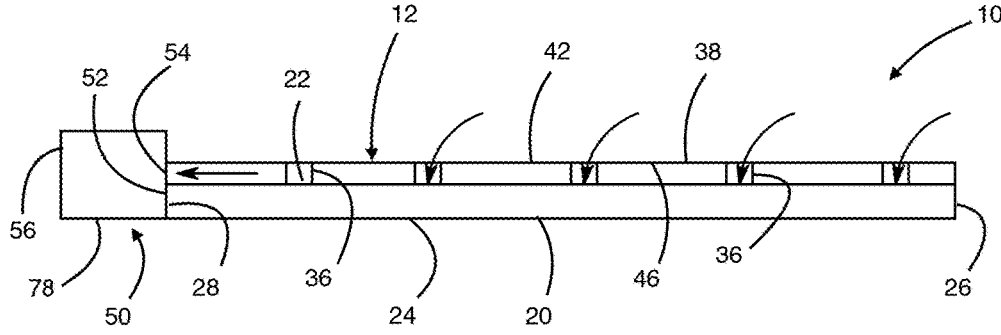
FIG. 3 is a side view of the floor mat of FIG. 1 showing the direction of airflow.

In one embodiment, as shown in (or understood from) FIGS. 2 and 3, bottom side 46 of mesh cover 42 is in contact with, and supported by, upper surface 38 of base 20 member. In other embodiments (not shown), one or more intermediate supports are provided to suspend mesh cover (42) above upper surfaces (38). Such intermediate supports may be, but are not limited to, a plurality support flange extending from rim (40)—which may be arranged in the space between bottom side (46) and upper surface (38)—or posts/studs extending upwards from one or both of top side (22) of base (20) member and upper surfaces (38) of ridges (34), or a combination thereof.

Mesh cover 42 is configured with a plurality of mesh openings or holes sized to allow the passage of liquids therethrough and into grooves 36 of base member 20. Mesh cover 42 may also serve as a container or tray for temporarily storing larger sized waste matter, such as solid or semi-solid waste that does not fit though the mesh openings. Such larger waste is retained on top surface 44. A rim 40 (described below in further detail) is shown in FIG. 7. Rim 40 has a height greater than the combined height of base member 20 and mesh cover 42 when base member 20 and mesh cover 42 are mated. Accordingly, the relative greater height of rim 40 prevents waste matter from spilling or rolling off at least from the sides of the top surface 44 and onto the vehicle's floor.

In one embodiment, mesh cover 42 is entirely contained within the interior space formed by rim 40 when mesh cover 42 is mated with base member 20.

In one embodiment, mesh cover 42 is easily detachably coupled to base member 20. Such coupling may include, but is not limited to, any one of: simply resting mesh cover 42 on top of upper surfaces 38, using a clamping mechanism, using hook-and-loop fasteners, snap fasteners, magnetic fasteners or closures, or a combination thereof. In another embodiment, mesh cover 42 is integrally formed with base member 20.

Mesh cover 42 is constructed of one or more materials such that, when mesh cover 42 is mounted or coupled to base member 20 (in accordance with the above descriptions), it is sufficiently sturdy (and supported by base member 20) to support the weight of a passenger standing atop mesh cover 42 as they enter or exit the vehicle.

Due to the runoff from riders' footwear as they enter the vehicle, top side 44 may become slippery, which poses a safety issue for riders. To address this concern, and in accordance with one embodiment (not specifically shown in the drawings), mesh cover 42 includes one or more traction features to provide a non-slip surface, such as, but not limited to, a textured surface, a rubberized or other high-friction material (e.g., silicone) coating, or a combination thereof. The textured surface may incorporate patterns, grooves, or raised bumps, or a combination thereof, on top side (44) surface of the mat, thereby creating friction between top side (44) mat and the rider's footwear. The coating may be applied uniformly or in specific areas and patterns as desired.

In one embodiment, the bottom side (or "underside") 24 of base member 20 is configured with one or more anti-slip features. For vehicles with carpeted floors, anti-slip features may include, but is not limited to, a textured underside surface, rubber nubs or spikes, grip pads, an anti-ski backing, hook-and-loop fastener (e.g., Velcro), and weighted corners or edges, or a combination thereof. For vehicles without carpeting, anti-slip features may include, but is not limited to, all of the aforementioned types, and additionally suction cups, or a combination thereof.

The configuration and size of the footwell 80 (see FIG. 1) in a vehicle can vary significantly depending on the vehicle type. As such, floor mats 10 may be provided in a variety of sizes and dimensions to accommodate the footwell 80 dimensions of the vehicle in question. For instance, for an average sedan, the front driver and passenger floor mats 10 are typically about 26 inches in length by about 17 inches in width, and the rear passenger floor mats 10 are typically between 13 to 19 inches in length by about 17 inches in width. The floor mats are typically considerably longer for SUV models. Sizing variations are available for compact and micro cars, as well as trucks.

As described above, FIGS. 2 and 4 show vacuum assembly 50 as divided by vertical filter 60 into first or waste compartment 66 and second or fan/vacuum compartment 68. Vacuum assembly 50 is a generally rectangular-shaped receptacle having a front 52 having one or more air inlet apertures 54 and a rear 56 having at least one air outlet or exhaust port 58.

Figures 8, 9:
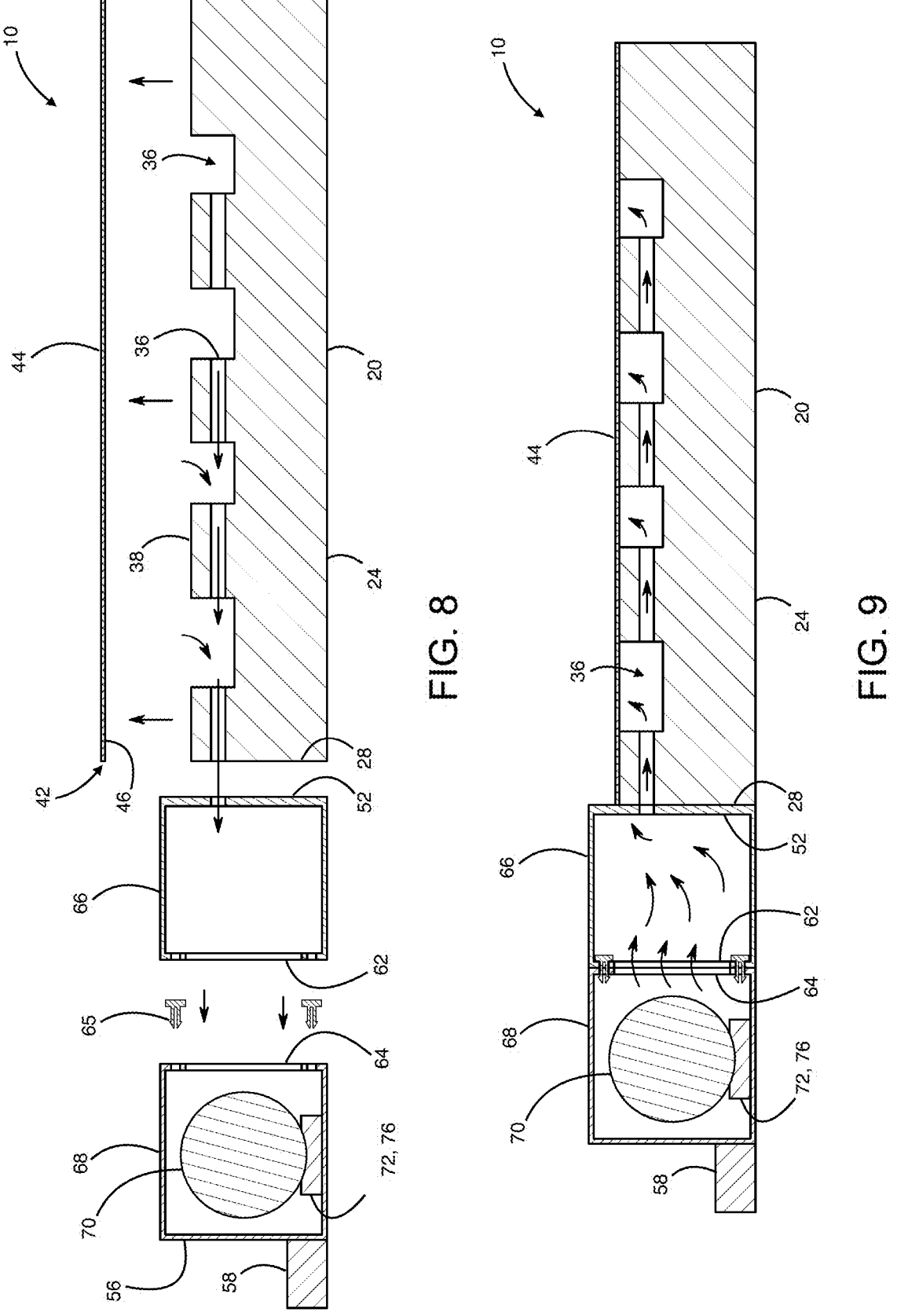
FIG. 8 is an exploded side view of a vehicular floor mat according to one embodiment of the present invention.
FIG. 9 is a side view of the floor mat of FIG. 8 showing a direction of airflow.

In one embodiment, as shown in FIGS. 8-9, first compartment 66 and second compartment 68 are easily detachably coupled, such as with pins 65. Additionally, first compartment is detachably coupled to base member 20. Users may optionally remove only second compartment 68 if desired—such as replacement is needed—or removal of the entire vacuum assembly 50, either intact or after decoupling first and second compartments 66 and 68.

First compartment 66 is configured to receive liquid, dust and debris through the one or more inlet apertures 54 formed in the dividing wall between base member 20 on the front, and vacuum assembly 50/first compartment 66 on the back.

In particular, the dividing wall is identified in the drawings (e.g., FIG. 2) as the rear 28 of base member 20 and the front 52 of first compartment 60. The dividing wall may be interchangeably referred to as front 52 or rear 28. Accordingly, in some figures separate lead lines are provided for numerals 28 and 52 (see FIGS. 2 and 3), whereas in other figures a single lead line is provided for both (see FIGS. 4 and 8-9).

Second compartment 68 houses a blower wheel 70, a motor 72 for operating blower wheel 70, a drive shaft 74 therebetween for transmitting rotational motion and power from motor 72 to blower wheel 70, and a power source 76 for powering motor 72. Power source 76 may include, but is not limited to, one or more batteries. The one or more batteries may be rechargeable or disposable, or a combination thereof. In another embodiment (not shown), power source (76) is housed outside of, and adjacent to, second compartment 68.

Vertical filter 60 has a front 62 and a rear 64. (Front 62 may also be referred to as the rear of first compartment 66. Similarly, rear 64 may also be referred to a the front of second compartment 68.) In one embodiment, vertical filter 60 is inserted between first and second compartments 66 and 28 when they are uncoupled. In one embodiment, when first and second compartments 66 and 68 are coupled, vertical filter may be slid or inserted into a slot or space formed therebetween.

In one embodiment, at least one of the vertical filters 60 is arranged between first and second compartments 66 and 68.

In an embodiment, at least two vertical filters 60 are arranged between first and second compartments 66 and 68. In an embodiment, the filters 60 may be slid or inserted into a slot or space as described above. Alternatively, one filter 60 may be coupled to the first compartment (and this may be indicated by numeral 62) and another filter 60 may be coupled to the second compartment (and this may be indicated by numeral 62). When the two compartments 66 and 68 are coupled, the two filters 60 are held together.

As blower wheel 70 creates suction, air, wastewater and other substances that have dripped or settled into channels 36 of base member 20, is pulled into first compartment 66. Vertical filter 60 acts as a barrier, preventing undesirable wastewater, etc., from entering second compartment 68, while allowing cleaned air to enter second compartment 68 and ultimately exit through exhaust port 58 at rear 56 of vacuum assembly 50.

In an alternative embodiment, the above-described vacuum assembly 50 having a blower wheel 70 for generating a vacuum of suction force may be substituted with another suitable apparatus or system known in the art.

Figures 5, 6:
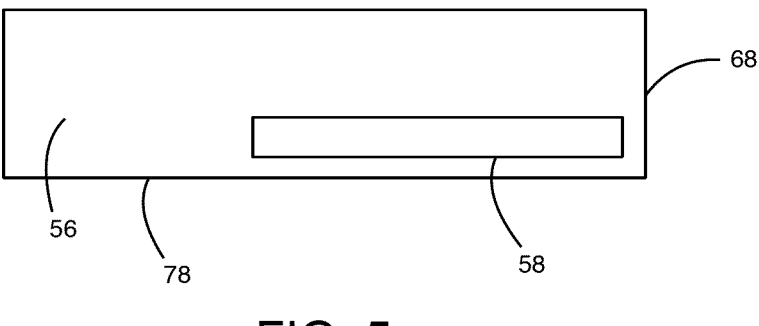
FIG. 5 is a partial view, showing an exhaust port according to one embodiment of the present invention.
FIG. 6 is a partial view, showing inlet apertures according to one embodiment of the present invention.

In one embodiment, as shown in FIG. 6, a pair of wider upper inlets 54 and three narrower lower inlets 54 is provided. The number and orientation or position of inlet apertures 54 can vary depending on the need and overall configuration of floor mat 10, as would understood in the art. The lower inlets 54 are the above-described inlets configured to receive water or waste that has accumulated in channels 36, underneath mesh cover 42. The upper inlets 54 are configured to receive waste or water that has accumulated atop mesh cover 42.

Exhaust port 58 may be arranged or oriented in one of three ways: parallel to floorboard 80 (i.e., "horizontal orientation"), facing up (i.e., "vertical orientation"), or angled. In the horizontal orientation, exhaust port 58 has no vertical tilt, and thus expels gases or air directly along the same level as exhaust port 58. In the vertical orientation, exhaust port

58 is oriented vertically (towards the vehicle's roof) and thus directs the exhaust gases or air in an upward direction. In the "angled" arrangement, exhaust port 58 is positioned at an intermediate angle between the aforementioned horizontal and vertical orientations. It can be tilted upwards at a specific degree to create an inclined angle relative to the horizontal plane, as desired.

In one embodiment, as shown in the figures, the underside 24 of base member 20 and the underside 78 of vacuum assembly 50 are aligned.

FIG. 3 shows two distinct airflow patterns indicated by the arrows. First, air is shown flowing downward, from an external source (e.g., ambient air in the vehicle), through mesh cover 42 into channels 36 of base member 20. This airflow direction is depicted by four downward curving arrows pointing towards top side 22 of base member 20. Additionally, there is another airflow within main body 12 that is directed towards the rear 28. A single, horizontal arrow pointing towards rear 28 of base member 20 (and front 52 of vacuum assembly 50) represents the rearward airflow. Both of the foregoing downward and rearward airflows is the result of suction or vacuuming force generated by blower wheel 70 of vacuum assembly 50, which draws the air (and unwanted slosh and other waste matter) through inlet apertures 54 and into first compartment 66. The suctioned air is then drawn through vertical filter 60 where it is cleaned before it enters second compartment 68 and exists through exhaust port 58.

FIG. 8 shows a similar airflow pattern as that described above in connection with FIG. 3. The additional three vertical arrows depict an exploded view of mesh cover 42 being separated from base member 20.

FIG. 9 shows airflow patterns indicated by the arrows, which are oriented in the opposite direction from the airflow patterns shown in FIG. 3 (described above). In one embodiment, blower wheel 70 is configured capable of rotating in a first direction, resulting in the airflow patterns shown in FIG. 3, and capable of rotating in a second direction, resulting in the airflow patterns shown in FIG. 9. When rotating in the second direction, air enters second compartment 68 via exhaust port 58 (acting an inlet), which passes through vertical filter 60 and exists vacuum assembly 50 via inlets apertures 54 (acting as outlets). The benefit of additionally providing the second direction of rotation is to force air back through channels/grooves 36 so to loosen or clear them of waste. In another embodiment, blower wheel 70 is configured to rotate only in the aforementioned second direction.

In one embodiment, an activation switch (e.g., an on-off switch) is provided on or near power source 76 or elsewhere along the exterior of second compartment 68.

In one embodiment, blower wheel 70 is configured with remote activation. In this embodiment, a microcontroller and a communications module (e.g., a transceiver) are provided. The microcontroller is a programmable integrated circuit that receives signals from the remote control device (e.g., a smart phone programmed with a counterpart remote control application) and sends commands to activate or deactivate blower wheel (70). The transceiver module enables wireless communication between the remote control device and the microcontroller and can be based on technologies such as, but not limited to, Bluetooth or BLE, UWB, Wi-Fi, or RF, or a combination thereof. Additionally provided are the software components, including firmware and, optionally, communication protocol(s). The firmware runs on the microcontroller, controlling its behavior and enabling communication with the transceiver module and blower wheel (70). The communication protocol may be programmed, in part, on the microcontroller (or on the remote control device) with a set of rules and conventions that govern the communication between the remote control device and the microcontroller. One embodiment for remote activation is shown in FIG. 4 where a remote-control device 100 interacts with a radio wave receiver inside the motor 72, which then activates the blower wheel, regulating its speed and direction of rotation. A remote-control device 100 may control all floor mats 10 individually or may activate or deactivate all floor mats at the same time. A representative remote-control device 100 may be a freestanding piece of equipment or built into instrumentation of a vehicle, which may reside inside the dash, door controls, island controls or steering wheel controls.

In one embodiment, blower wheel (70) is configured with preset timer activation.

In one embodiment, a built-in console is provided that is operatively connected to the microcontroller. The console serves as a user interface, enabling a user to access and program the vacuum assembly (50) manually. Through the user interface, users can activate blower wheel (70), schedule the preset timer, check the battery level, error notifications, or access other features. If base member 20 is configured with sensors to detect the presence of waste, etc., the user interface can provide the cleaning progress (if blower wheel 70 is active) or the waste status (if blower wheel is inactive). The console may be provided on the outer surface of second compartment (68) or in a recess under an access panel/cover for protection from waste, etc.

The user interface may also, or alternatively, be accessed remotely via the above-described remote control device.

FIG. 5 shows rear 56 of vacuum assembly 50, including exhaust port 58. In another embodiment, multiple exhaust ports (58) are provided, which is especially useful when blower wheel 70 is operated in the second direction of rotation, described above in connection with FIG. 9, so as to increase intake airflow from exhaust port 58.

FIG. 1 depicts one front seat floor mat 10 and one rear sear floor mat 10. As shown, both of the floor mats 10 have a main body 12 (as defined above) and a vacuum assembly 50 arranged and coupled to the main body 12 at rear 28.

FIG. 7 depicts two front seat floor mats 10 and two rear seat floor mats 10. As shown, each of the floor mats 10 has a main body 12 (as defined above) including a rim 40. With each of the front seat floor mats 10, vacuum assembly 50 coupled to the front 26 of main body 12. With the rear seat floor mats 10, vacuum assembly 50 is coupled to rear 28 of main body 12. In this embodiment (and as described above), vacuum assembly 50 is depicted as detachable from main body 12.

It should be understood that rim 40 is not intended to interfere with drainage from main body 12 to first chamber 66. Accordingly, where present, rim 40 does not obstruct inlet apertures 54. Either rim 40 is not presented on the side (i.e., either at front 26 or at rear 28) at which vacuum assembly 50 is coupled to main body 12, or rim 40 is configured with cooperating outlets in communication with inlet apertures 54 to facilitate the desired drainage.

The above-described arrangements of vacuum assembly 50 at front 26 or at rear 28 depend on the seating and footwell layout for each model or category/class of vehicle. Vacuum assembly 50 is positioned in such way as to avoid obstruction of the driver or passenger's feet. Accordingly, in a vehicle where space is provided underneath an overhang of the seat such that the passenger's feet will likely not enter that space, it may be desirable to position vacuum assembly 50 to the rear 28 of main body 12, such as shown in FIG. 1. In other vehicle configurations, it may be desirable to position vacuum assembly 50 forward of front 26 of main body 12, such as shown in FIG. 7.

The following is a list of reference numerals and associated parts as used in this specification and drawings:

| Part | Reference numeral |
|---|---|
| Floor mat | 10 |
| Main body | 12 |
| Base (or Base member) | 20 |
| Top side [or "top surface"] (of Base) | 22 |
| Bottom side [or "Underside"] (of Base) | 24 |
| Front (of Main body or Base) | 26 |
| Rear (of Main body or Base) | 28 |
| Right and left sides (of Main body or Base) | 30, 32 |
| Bosses or Ridges | 34 |
| Channels or grooves | 36 |
| Upper surface (of Base or Bosses/Ridges) | 38 |
| Peripheral border/rim (of Main body or Base) | 40 |
| Horizontal mesh filter (or Mesh cover) | 42 |
| Top side [or "top surface"] (of Horizontal filter) | 44 |
| Bottom side [or "underside"] (of Horizontal filter) | 46 |
| Vacuum assembly | 50 |
| Front (of Vacuum assembly) | 52 |
| Inlet aperture(s) or port(s) | 54 |
| Rear (of Vacuum assembly) | 56 |
| Air outlet or exhaust port | 58 |
| Vertical mesh filter | 60 |
| Front (of Vertical filter) | 62 |
| Rear (of Vertical filter) | 64 |
| Pin(s) | 65 |
| First (waste) compartment | 66 |
| Second (vacuum) compartment | 68 |
| Blower wheel | 70 |
| Motor | 72 |
| Drive shaft | 74 |
| Power source | 76 |
| Bottom side [or "Underside"] (of Vacuum assembly) | 78 |
| Footwell or Floorboard | 80 |

The invention claimed is:

1. A vehicular floor mat configured to receive water or waste, comprising:

a main body comprising a solid base member and a mesh cover, each of the base member and the mesh cover having respective and aligned front, rear, right and left sides, and top and bottom surfaces;

a plurality of ridges integrated into, and extending vertically from, the top surface of the base member, the ridges configured to form a plurality of channels across the top planar surface of the base member; wherein each channel of said plurality of channels is between any two parallel ridges of said ridges, such that said any two parallel ridges form side walls of each said channel, said bottom surface forms a bottom wall of each said channel, and wherein said mesh cover forms a top of each said channel;

a vacuum assembly having a front, rear, and right and left sides, the vacuum assembly comprising a first compartment configured to receive the water or waste directly through said main body through one or more inlet ports disposed at the front of the vacuum assembly, a second compartment housing a blower wheel, a motor, and a drive shaft having a one end operatively associated with the motor and another end operatively associated with the blower wheel, said second compartment having at least one exhaust port; wherein said first compartment is disposed horizontally in line between said main body and said second compartment; wherein, a vertical filter disposed between the first and second compartments, and wherein said vertical filter and said second compartment separates said first compartment from said at least one exhaust port;

wherein said plurality of channels configured to collect and channel the water or waste to the one or more inlet ports;

wherein said inlet ports of said first compartment are directly open to said plurality of channels and are in direct air communication with said plurality of channels, and wherein said inlet ports are level with said plurality of channels; and wherein, when the motor is activated, the motor causes the drive shaft to engage the blower wheel, whereby the blower wheel creates a suction force to draw the water or waste from said plurality of channels, through the one or more inlet ports; and into the first compartment and wherein said first compartment configured to retain said water and waste; wherein said first compartment is removable from said main body and where said second compartment is removable from said first compartment;

wherein said blower wheel spins along an axle that is coaxial to the orientation of said main body, said first compartment and said second compartment; and into the first compartment and wherein said first compartment configured to retain said water and waste; wherein said first compartment is removable from said main body and where said second compartment is removable from said first compartment.

2. The floor mat of claim 1, wherein the plurality of ridges has an at least substantially planar upper surface, and wherein the mesh cover is configured to rest upon and be supported by the upper surface of the plurality of ridges.

3. The floor mat of claim 2, wherein the mesh cover is detachably coupled to the base member.

4. The floor mat of claim 1, wherein the second compartment further houses a power source operatively associated with the motor.

5. The floor mat of claim 4, wherein the second compartment further houses a communications module configured to receive a signal from a remote device, and a controller operatively associated with the motor and configured to receive the signal from the communications module, the controller programmed to activate or deactivate the motor based on the signal.

6. The floor mat of claim 1, wherein the ridges are configured so as to form at least substantially parallel and perpendicular longitudinal and lateral channels of said plurality of channels.

7. The floor mat of claim 1, wherein the ridges are at least substantially rectangular.

8. The floor mat of claim 1, wherein some channels of said plurality of channels are at least partially curved.

9. The floor mat of claim 1, wherein the main body further comprises a peripheral border rim adjoining the base member, the rim having a height greater than the height of the base member and mesh cover when the mesh cover is coupled to the base member.

10. The floor mat of claim 1, wherein the vacuum assembly is detachably coupled to the base member.

11. The floor mat of claim 10, wherein the vacuum assembly is detachably coupled to the front of the base member.

12. The floor mat of claim 10, wherein the vacuum assembly is detachably coupled to the rear of the base member.

13. The floor mat of claim 1, wherein the second compartment is detachably coupled to the first compartment.

14. The floor mat of claim 13, wherein the first compartment is detachably coupled to the front of the base member.

15. The floor mat of claim 13, wherein the first compartment is detachably coupled to the rear of the base member.

16. The floor mat of claim 1, wherein the one or more exhaust ports have a horizontal orientation.

17. The floor mat of claim 1, wherein the one or more exhaust ports have a vertical orientation.

18. The floor mat of claim 1, wherein the one or more exhaust ports have an angled orientation, wherein the one or more exhaust ports are positioned at an intermediate angle between horizontal and vertical orientations.

19. The floor mat of claim 1, wherein first compartment has an inner cavity for storing the water or waste.

20. The floor mat of claim 1, wherein the first compartment has a removable cover.

*    *    *    *    *